United States Patent
Eckley, IV et al.

(10) Patent No.: US 8,483,084 B2
(45) Date of Patent: Jul. 9, 2013

(54) NETWORK MONITORING SYSTEM

(75) Inventors: James W. Eckley, IV, Adamstown, MD (US); Kenneth S. Lambert, Boyds, MD (US); Andrew Sachs, Gaithursburg, MD (US)

(73) Assignee: JDS Uniphase Corporation, Milpitas, CA (US)

( * ) Notice: Subject to any disclaimer, the term of this patent is extended or adjusted under 35 U.S.C. 154(b) by 257 days.

(21) Appl. No.: 13/182,198

(22) Filed: Jul. 13, 2011

(65) Prior Publication Data

US 2012/0014277 A1    Jan. 19, 2012

Related U.S. Application Data

(60) Provisional application No. 61/363,880, filed on Jul. 13, 2010.

(51) Int. Cl.
*H04L 12/26* (2006.01)

(52) U.S. Cl.
USPC ........... 370/252; 370/254; 370/328; 370/338; 709/224

(58) Field of Classification Search
USPC .................... 370/252, 254, 328, 338; 709/224
See application file for complete search history.

(56) References Cited

U.S. PATENT DOCUMENTS

| | | | | |
|---|---|---|---|---|
| 7,536,417 B2 * | 5/2009 | Walsh et al. | | 1/1 |
| 7,596,417 B2 * | 9/2009 | Fister et al. | | 700/56 |
| 2010/0279700 A1 * | 11/2010 | Kim et al. | | 455/452.1 |

* cited by examiner

*Primary Examiner* — Michael J Moore, Jr.
*Assistant Examiner* — Luna Weissberger
(74) *Attorney, Agent, or Firm* — Matthew A. Pequignot; Pequignot + Myers LLC

(57) ABSTRACT

A deployed communications network, providing voice, video and data, has millions of devices on the network including customer premises equipment (CPE), such as set top boxes and residential gateways. The present invention relates to the use of scaling techniques for minimizing the cost of hardware yet provide a monitoring solution for large networks. CPE's are grouped into groups according to geographical location and/or quality of operation, and the frequency and order of data collection is based on a hierarchical, round-robin structure of the CPE groups and the status of each CPE.

19 Claims, 5 Drawing Sheets

NETWORK MONITORING SYSTEM

CROSS-REFERENCE TO RELATED APPLICATIONS

The present invention claims priority from U.S. Patent Application No. 61/363,880 filed Jul. 13, 2010, which is incorporated herein by reference for all purposes.

TECHNICAL FIELD

The present invention relates to a network monitoring system, and in particular to a network monitoring system for monitoring a very large network with limited hardware.

BACKGROUND OF THE INVENTION

The broadband access market, designed to provide voice, data and video ("triple play") services to households and businesses, includes two major technologies, i.e. cable and digital subscriber line (DSL), and one up and coming challenger, i.e. fiber to the home (FTTH) or fiber to the curb (FTTC). Other minor players include satellite network solutions, e.g. Direct TV, and wireless solutions, e.g. WiMax. Each technology enables the customer's equipment to be connected to the internet, the telephone network, and the television/video service providers. In addition, a growing demand for extra services, such as voice over internet protocol (VoIP), internet protocol television (IPTV), video on demand (VoD), and online gaming have increased the demand for bandwidth and the necessity for operators to monitor their networks to ensure compliance with marketing claims.

With reference to FIG. 1, a typical local loop 1 is comprised of a digital subscriber line (DSL), a coaxial cable or an optical fiber for transmitting telephone, data and video signals to and from each customer premises equipment (CPE). Each CPE is comprised of a residential gateway (RG) or optical network terminal (ONT) 2, which is connected to one or more of the customer's telephone 4a, computer 4b and television 4c, via additional signal-specific CPE, e.g. a VoIP analog terminal adaptor (ATA) 6a, a modem 6b, and a set top box (STB) 6c, respectively. The ATA 6a, the modem 6b and the STB 6c can be built into the RG or ONT 2 or the customer's equipment 4a, 4b and 4c. The CPE 2 is connected to the internet 7 and/or corresponding communication networks via an access device or node 8a located in a central office 3 of the telephone company or cable provider, and a router or hub 9 located at an internet service provider 10.

DSL (digital subscriber line) is a broadband access technology that enables high-speed data transmission over existing copper telephone wires, which connect customer premises equipment (CPE) 2, e.g. a xDSL modem, to the local telephone company's central office 3. DSL technology is able to achieve a data rate of up to 52 Mbps by using advanced signal modulation technologies in the 25 kHz and 1.1 MHz frequency range in contrast to the conventional analog modem access, which is limited to a data rate of 56 Kbps at signal frequencies up to 4 kHz.

A Digital Subscriber Line Access Multiplexer (DSLAM) 8a is an access device at the phone company's central location 3 that links many customers DSL connections 1 to a single high-speed backbone line 11, e.g. asynchronous transfer mode (ATM), frame relay or Internet Protocol, and multiplexes the multiple signals into one combined signal 12. When the phone company receives a DSL signal from a customer, an asymmetric digital subscriber line (ADSL) modem 13 with a Plain Old Telephone Service (POTS) splitter detects voice calls and data. Voice calls are sent to the public switched telephone network (PSTN) 14, and data signals are sent to the DSLAM 8a. Each DSLAM 8a has multiple aggregation cards, and each such card can have multiple ports to which the customers lines are connected. Typically a single DSLAM aggregation card has twenty four ports, but this number can vary with each manufacturer. The most common DSLAMs are housed in a telco-grade chassis, which are supplied with (nominal) 48 volts using DC. Hence a typical DSLAM setup may contain power converters, DSLAM chassis, aggregation cards, cabling, and upstream links. The most common upstream links in these DSLAMs use gigabit ethernet or multi-gigabit fiber optic links.

A fibre optic node 8a in a cable or hybrid fiber-coaxial (HFC) network has a broadband optical receiver, which converts the downstream optically modulated signal coming from the hub 9 to an electrical signal going to the CPE 2. Today, the downstream signal is a radio frequency modulated signal that typically begins at 50 MHz and ranges from 550 MHz to 1000 MHz on the upper end. The fibre optic node (OLT) 8a also contains an upstream path transmitter that sends communication from the CPE 2 to the ISP 10. In North America, the upstream signal is a modulated radio frequency ranging from 5 to 42 MHz while in other parts of the world, the range is 5 to 65 MHz.

For fiber to the home or fiber to the curb networks, each node 8a includes an optical multiplexer for combining the signals from each local loop into a combined optical data signal.

The combined data signal 12 is passed through the high-speed line 11 to the hub 9 with an equipment management system (EMS) for the CPE's 2, e.g. a broadband remote access server (B-RAS) or Auto Configuration Server (ACS) for DSL, at the internet service provider (ISP) 10. The hub 9, authenticates the subscriber's credentials, validates the users access policies, and routes the data to respective destinations on the internet 7. For full triple play internet accessed services, signals are transmitted from the CPE's 2 via the internet 7 to video providers 18, and various other internet service providers 19. Alternatively, if the ISP 10 is also the video provider, an additional router is provided to route signals to and from the internet 7, and to and from video servers. Returning data signals from the internet 7 pass through the hub, 9, e.g. B-RAS, the node 8a, e.g. DSLAM, before returning to the customer premises equipment (CPE) 2.

The optical portion of HFC or FTTC networks provide a large amount of flexibility. If there are not many fibre optic cables to the hub 9, wavelength division multiplexing can be utilised to combine multiple optical signals onto the same fibre. Optical filters are used to combine and split optical wavelengths onto the single fibre. For example, the downstream signal could be on a wavelength at 1310 nm and the return signal could be on a wavelength at 1550 nm. There are also techniques to put multiple downstream and upstream signals on a single fibre by putting them at different wavelengths.

VoIP traffic is extremely sensitive to delay and jitter, while IPTV traffic is particularly sensitive to packet loss. Both video and VoIP traffic need to be prioritized against the data services with uneven and unpredictable bandwidth utilization. Accordingly, monitoring and validating the performance and quality of service of triple play ready networks and devices has become an issue of strategic importance for service providers and equipment manufacturers.

With millions of devices on existing networks, the challenge is to monitor all of the devices and provide a real time view of the network's health, while minimizing cost and overhead of processing hardware.

An object of the present invention is to overcome the shortcomings of the prior art by classifying the various devices into groups, and then monitoring the devices in dependence upon which group they are in.

SUMMARY OF THE INVENTION

Accordingly, the present invention relates to a method of monitoring a plurality of customer premises equipment (CPE) devices connected to a network, utilizing a monitoring probe stored in a non-transitory machine readable storage device, the method comprising:

grouping the plurality of CPE devices into at a plurality of groups based on a commonality therebetween;

setting a first time period for collection of monitoring data for all of the CPE devices;

setting a plurality of subsets of CPE devices, each subset of CPE devices comprising a different CPE device from each of the groups;

setting a second time period, shorter than the first time period, for collection of monitoring data from one of the subsets of the CPE devices;

collecting monitoring data from each subset of CPE device during each corresponding second time period consecutively until the first time period expires and the monitoring data from all of the CPE devices is collected.

Another aspect of the present invention relates to a non-transitory machine-readable storage device for storing information enabling a network monitoring agent to perform a process, the process comprising:

grouping the plurality of CPE devices into at a plurality of groups based on a commonality therebetween;

setting a first time period for collection of monitoring data for all of the CPE devices;

setting a plurality of subsets of CPE devices, each subset of CPE devices comprising a different CPE device from each of the groups;

setting a second time period, shorter than the first time period, for collection of monitoring data from one of the subsets of the CPE devices;

collecting monitoring data during each second time period until the first time period expires and the monitoring data from all of the CPE devices is collected.

Another feature of the present invention provides a method monitoring a plurality of customer premises equipment (CPE) devices connected to a network comprising:

a) determining a state of quality of operation of each of the plurality of CPE devices and grouping the plurality of CPE devices into at least first and second modes based on the quality of operation;

b) setting a frequency for collection of the monitoring data for each CPE device based on the mode in which the CPE device was set, the first mode of devices being monitored more frequently than the second mode; and c) setting which set of statistics are to be collected based on the mode in which the CPE device was set, the first mode of CPE devices having more statistics collected than the second mode of CPE devices.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
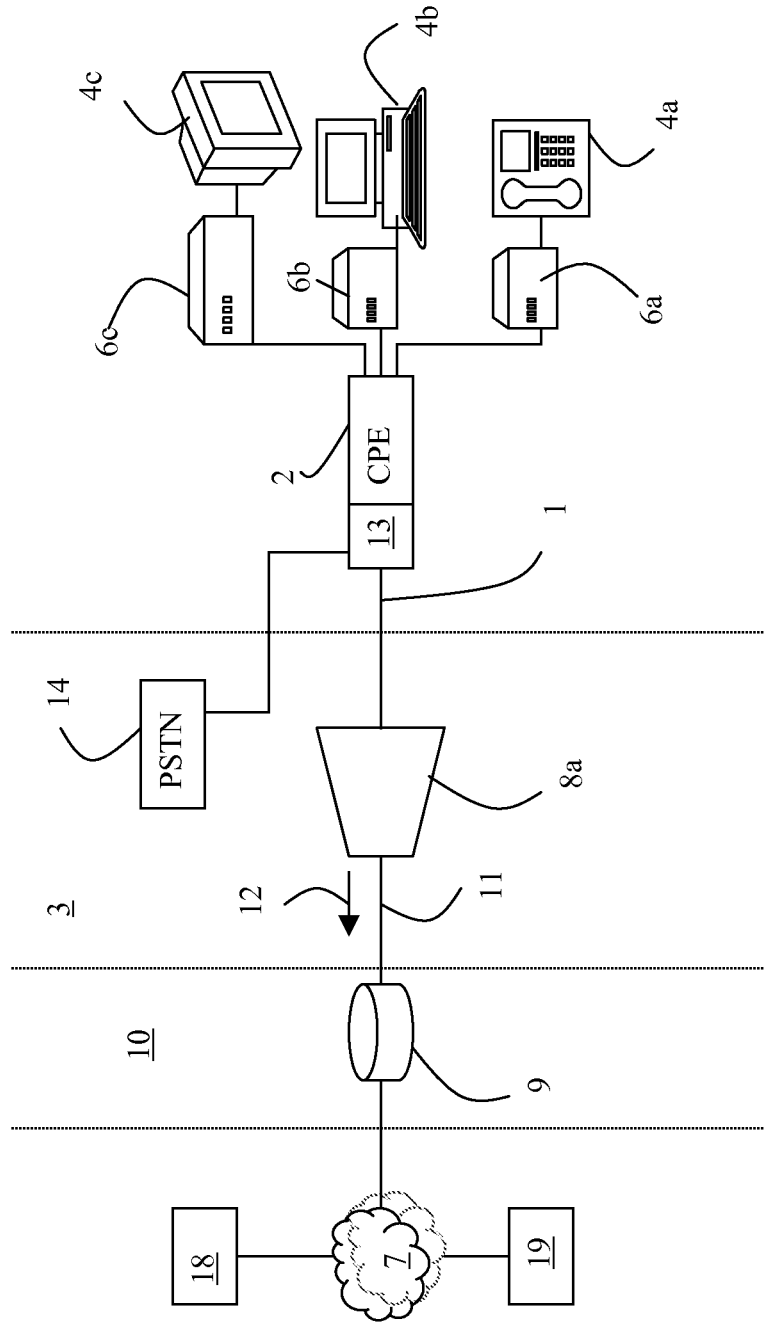
FIG. 1 is a schematic representation of a conventional broadband communication network.
Figure 2:
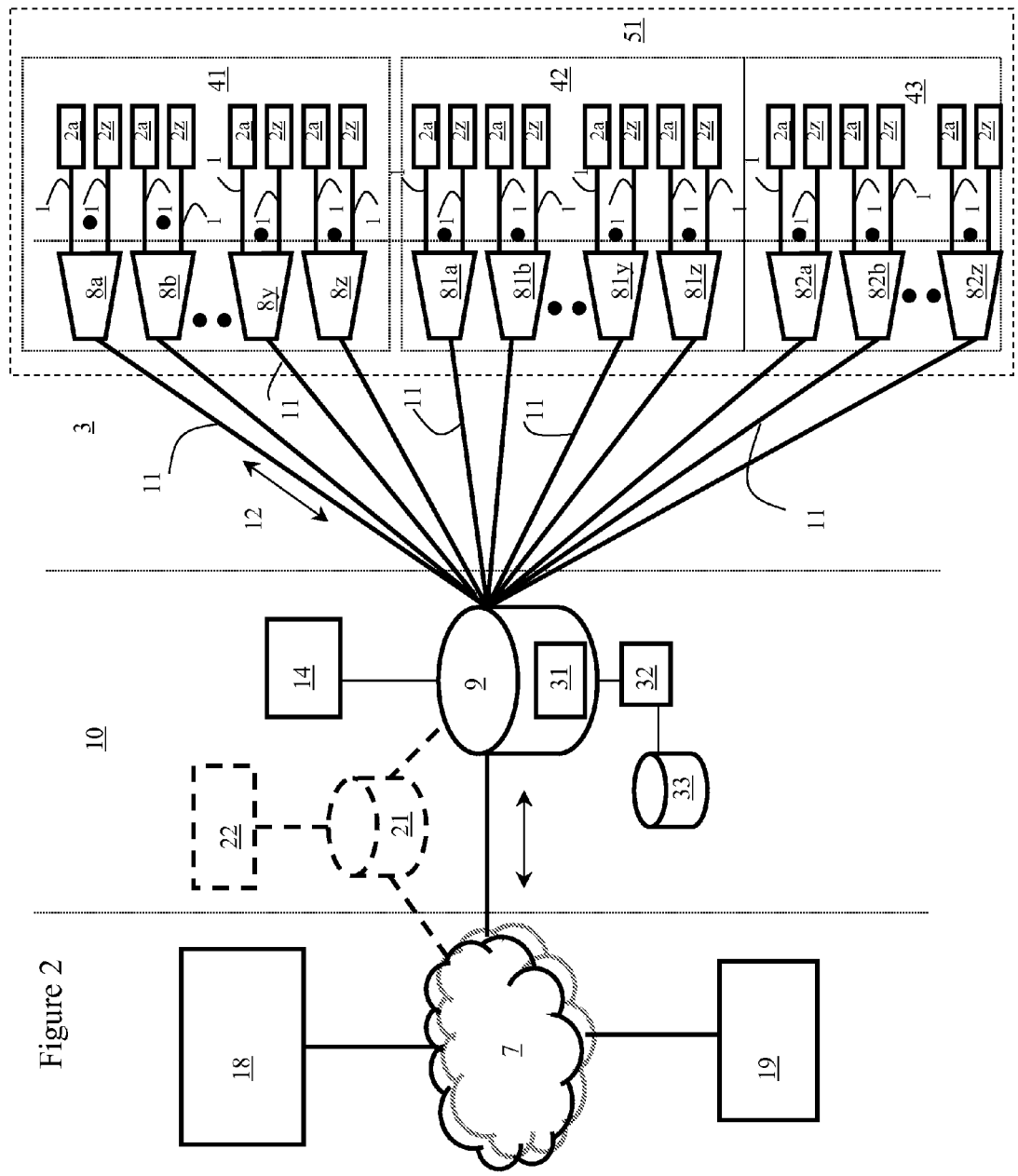
FIG. 2 is a schematic representation of a broadband communication network including the network monitoring system of the present invention.

With reference to FIG. 2, the present invention relates to a network monitoring system disposed in a broadband communications network, as hereinbefore defined with reference to FIG. 1. The network monitoring system includes an element management system (EMS) 31, e.g. an auto configuration server (ACS) or a broadband remote access server (B-RAS), provided in or connected to a network hub 9 for command and control of a plurality of dispersed network gear, including wireless devices, various monitoring devices, and conventional customer premises equipment (CPE), which for the sake of convenience will all be referred to hereinafter as CPE devices. The EMS 31 includes a computer system with a central processing unit, a non-transitory machine readable storage device, and suitable control and monitoring software thereon. A monitoring probe 32, which is typically a computer executable program capable of executing the timing and retrieval instructions of the present invention, is in communication with the EMS 31, i.e. either stored on the same computer system as the EMS 31 or in a separate computer system with its own non-transitory machine readable storage device connected thereto. A storage memory, e.g. database, 33 is in communication with the monitoring probe 32 for storing results of the various monitored statistics. The memory 33 can be on the same computer system as the EMS 31 and/or the monitoring probe 32 or on a separate computer system connected to the monitoring probe 32. The probe 32 and the memory 33 can be housed in a separate piece of hardware connected to the EMS 31 or at other positions in the network, if required.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Typically, each CPE is comprised of a residential gateway (RG) or optical network terminal (ONT) 2, which is connected to one or more of the customer's telephone 4a, computer 4b and television 4c, via additional signal-specific CPE, e.g. a VoIP analog terminal adaptor (ATA) 6a, a modem 6b, and a set top box (STB) 6c, respectively. However, other forms of customer devices are within the scope of the invention. The ATA 6a, the modem 6b and the STB 6c can be built into the RG or ONT 2 or the customer's equipment 4a, 4b and 4c. Typically, the ATA 6a, the modem 6b, the STB 6c, and any other part of the CPE 2 generates and provides statistics for sending upstream to the EMS 31 and the probe 32. The probe 32 can also send test instructions to the EMS 31 or individual CPE's, which would then execute the tests on the designated CPE's and send the results back to the probe 32. The probe 32 can also initiate tests on the individual CPE's, e.g. send a ping to determine if CPE is working.

Initially, the probe 32 maps every CPE 2 from which data is collected in the network into a plurality of separate groups, each with a plurality of CPE's 2, according to a predetermined commonality, e.g. network proximity, service type, link or geographical location. Ideally, each group has substantially the same number of CPE's 2, e.g. 10 to 100. Ideally, for geographical hierarchies, each access device or node 8a to 8z, 81a to 81z and 82a to 82z forms there own group, defined by all of the CPE's 2a to 2z connected to each node. Then the groups of CPE's are further mapped into a hierarchy of zones, (e.g. geographical areas, network types, services provided) increasing in size, e.g. number of CPE's, as the levels of the hierarchy increase, until the top level of the hierarchy, which encompasses all of the CPE's. The hierarchy includes a plurality of levels, e.g. two to six, but preferably 4 or 5. As an example, pluralities of different groups of CPE's are mapped into exchanges, e.g. portions of a metropolitan area with 10 to 100 exchanges, e.g. all of nodes 8a to 8z form one exchange 41, all of nodes 81a to 81z form a second exchange 42, and all of nodes 83a to 82z form a third exchange 43. Ideally, each exchange includes substantially the same number of groups. In a possible next level of the hierarchy, pluralities of different exchanges are mapped into cities with 10 to 100 exchanges, e.g. all of the exchanges 41, 42 and 42 are in a city 51 along with a plurality of other exchanges not illustrated. The mapping at each level can be performed using a predetermined list of CPE's 2 or generated automatically as the various CPE's 2 communicate with the network hub 9, i.e. the EMS 31. Other examples of the hierarchy include four or five levels including as an example: 1) CPE; 2) Access Node 8a; 3) Exchange 41, 4) City 51, 5) County (an area encompassing more than one city or metropolitan area, and 6) Region (an area encompassing a plurality of Counties; however, each level of the hierarchy may vary depending on the context of the network configuration and population distribution.

Alternative hierarchical structures are possible, such as a service commonality, e.g. levels of service for Video-on Demand or VoIP service; or an equipment commonality, e.g. devices having similar transmission speeds, e.g. super high speed, high speed, moderate speed, and low speed.

The aforementioned hierarchy of CPE's also facilitates display of the monitoring information and the current status of the network. An initial display on a graphic user interface electronically connected to the monitoring probe 32 provides a geographical map of the network divided into Regions (or the largest of the area designations, e.g. county, city etc), with each region having a color (or some other visual indication) indicative of the overall status of the network in that region. If a problem with the network exists in a specific region, a closer look at the region can be provided by accessing, e.g. clicking on, touching, the region in question, which will result in the region being displayed broken down into the next level of the hierarchy, e.g. counties or cities. Each county or city will also have a visual indication of the health or status of the network in that area, whereby the specific county, city, exchange, node and even CPE can be accessed by continually accessing the area in question and "drilling" down to the appropriate level of the hierarchy to determine whether the specific CPE, the node or the exchange is the problem, which needs fixing.

As defined above, the typical local loop 1 is comprised of a digital subscriber line (DSL), a coaxial cable or an optical fiber for transmitting one or more of telephone, data and video signals to and from each customer premises equipment (CPE) 2a to 2z, which are connected to one or more of the customer's telephone, computer and television set top box (not shown). For full triple play internet accessed services, signals are transmitted from the CPE's 2a to 2z via the internet 7 to video providers 18, and various other internet service providers 19. Alternatively, if the ISP 10 is also the video provider, an additional router 21 is provided to route signals to and from the internet 7, and to and from video servers 22. The CPE 2a to 2z are connected to the internet 7 and/or corresponding communication networks, e.g. 14, 18, 19 and/or 22, via an access device or node 8a to 8e located in a central office 3 of the telephone company or cable provider, and a router or hub 9 located at an internet service provider 10, which may also be the same entity as the telephone company or cable provider.

For a near-real time view of the overall network health, the probe 32 retrieves monitored statistics from selected CPE 2a to 2z devices based on the commonality, e.g. geographical, hierarchy throughout the day in a time-dependent evenly distributed fashion.

Data collection occurs in one of the following ways:

i) The probe 32 polls the EMS 31 synchronously and obtains the performance management statistics immediately in a single transaction.

ii) The probe 32 requests data from the EMS 31 and the probe 32 notifies the performance management statistics asynchronously, i.e. the EMS 31 pushes the data to the probe 32.

iii) The probe 32 publishes collection information to the EMS 31 and the probe 31 notifies the performance management statistics asynchronously based on the collection schedule.

Figure 3:
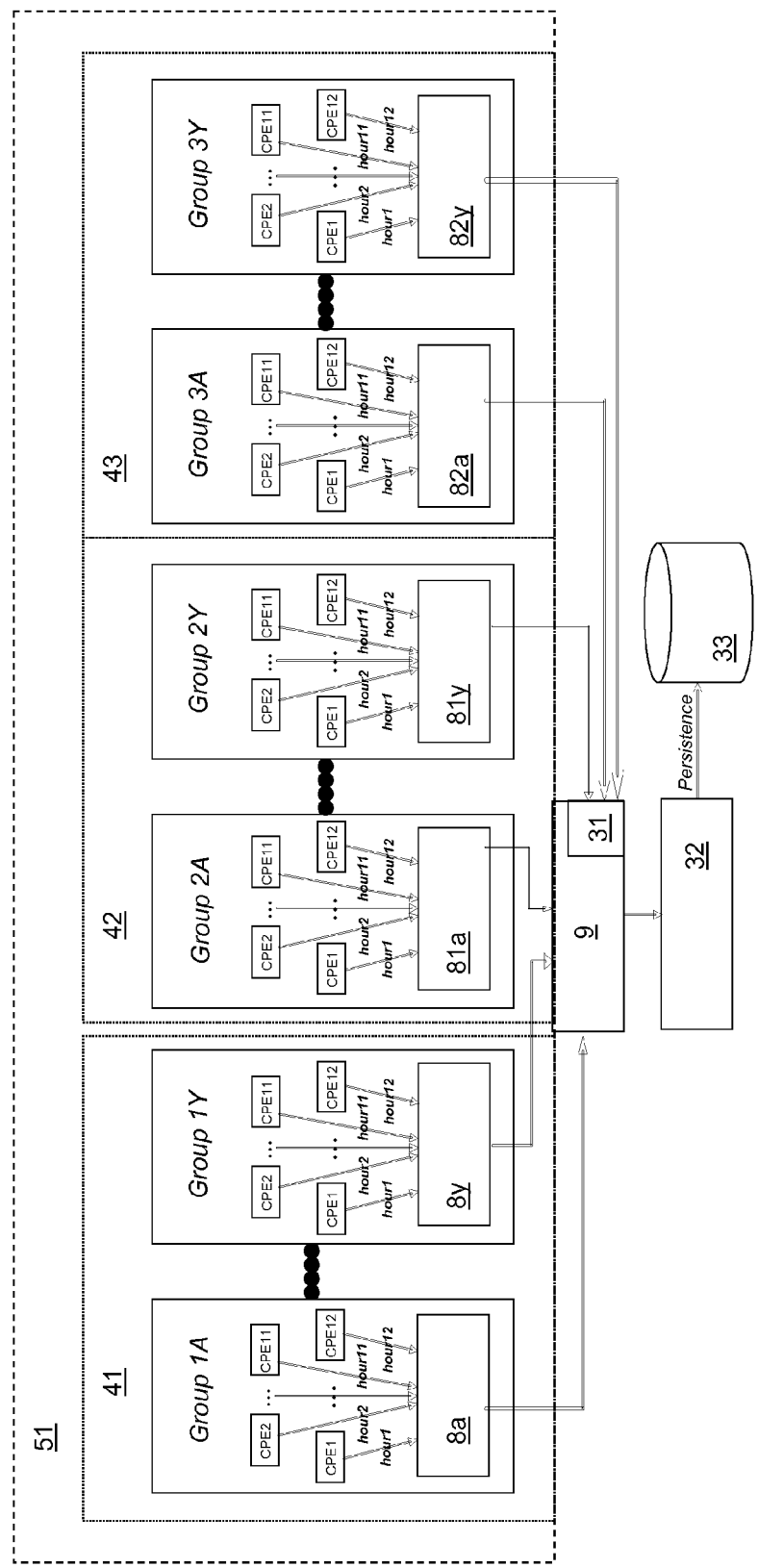
FIG. 3 is a schematic representation of a portion of the network of FIG. 2.

FIG. 3 illustrates a CPE city 51, i.e. a plurality of exchanges 41, 42 and 43 (amongst others not shown), each exchange made up of a plurality of nodes 8a to 8y, 81a to 81y and 82a to 82y, and each node made up of a plurality of CPE's 1 to 12, representing nine hundred customers, across the seventy-five nodes, over a first large time period. Rather than attempting the collection of monitoring data for every CPE device in each small group all at once or in short intervals, the approach of the present invention, utilizing the probe 32, is to spread out collection over the groups and over time by using the hierarchy information provided. In this example, collection is over a twelve hour period, although shorter and longer time periods are within the scope of the invention, preferably between 6 and 48 hours.

Performance management statistics are collected from the CPE EMS 31, e.g. the Broadband Forums' Auto-Configuration Server (ACS) statistics suite defined in the TR-069 protocol. The probe 32 drives the round-robin collection of results by retrieving the results from a subset of the CPE's comprising a smaller number, e.g. 1 to 4 and preferably one (CPE1), from each group 1A to 1Y, 2A to 2Y and 3A to 3Y in a given time segment, e.g. 15 minutes to 2 hours and preferably 1 hour, consecutively, which is shorter than the first time period. The retrieved statistics results are then persisted, i.e. stored, into the memory database 33. In a preferred embodiment, to save storage space in the memory 33, there are various levels of persistence, e.g. only bad or failing results, e.g. results below a predetermined threshold, are saved, while good or passing results, e.g. above a certain threshold, are simply deleted. Subsequently, in the next time segment, the probe 32 retrieves a second batch of statistical results comprised of data from the next subset of CPE's, namely another small number of CPE's, preferably one (CPE2), from each group 1A to 1Y, 2A to 2Y and 3A to 3Y. This step is repeated for each consecutive time segment until the first time period has expired. At the end of the first time period, which is made up of all of the time segments, all of the monitored data from all of the CPE's, CPE1 to CPE 12, will have been retrieved.

The following sequence demonstrates how the hierarchy information provided allows the virtual probe 32 to schedule collection in a time-sliced round-robin fashion, i.e. a sampled view of the network throughout the collection interval (in this case 12 hours).

Example CPE Data Collection

Hour 1: Exchange 51, City 41, Group 1A, CPE1; Exchange 51, City 41, Group, 1B CPE1; . . . Exchange 51, City 41, Group 1Y, CPE1; Exchange 51, City 42, Group 2A, CPE1; Exchange 51, City 42, Group 2B, CPE 1 . . . Exchange 51, City 42, Group 2Y, CPE1; Exchange 51, City 43, Group 3A, CPE 1; Exchange 51, City 43, Group 3B, CPE 1 . . . Exchange 51, City 43, Group 3Y, CPE 1.

Hour 2: Exchange 51, Group 1A, CPE2; Exchange 51, Group, 1B CPE2; . . . Exchange 51, Group 1Y, CPE2; Exchange 51, Group 2A, CPE2; Exchange 51, Group 2B, CPE2 . . . Exchange 51, Group 2Y, CPE2; Exchange 51, Group 3A, CPE2; Exchange 51, Group 3B, CPE2 . . . Exchange 51, Group 3Y, CPE2.

Hour 3: Exchange 51, Group 1A, CPE3; Exchange 51, Group, 1B CPE3; . . . Exchange 51, Group 1Y, CPE3; Exchange 51, Group 2A, CPE3; Exchange 51, Group 2B, CPE3 . . . Exchange 51, Group 2Y, CPE3; Exchange 51, Group 3A, CPE3; Exchange 51, Group 3B, CPE3 . . . Exchange 51, Group 3Y, CPE3.

. . .

Hour 11: Exchange 51, Group 1A, CPE11; Exchange 51, Group, 1B CPE11; . . . Exchange 51, Group 1Y, CPE11; Exchange 51, Group 2A, CPE11; Exchange 51, Group 2B, CPE11 . . . Exchange 51, Group 2Y, CPE11; Exchange 51, Group 3A, CPE11; Exchange 51, Group 3B, CPE11 . . . Exchange 51, Group 3Y, CPE11.

Hour 12: Exchange 51, Group 1A, CPE12; Exchange 51, Group, 1B CPE12; . . . Exchange 51, Group 1Y, CPE12; Exchange 51, Group 2A, CPE12; Exchange 51, Group 2B, CPE12 . . . Exchange 51, Group 2Y, CPE12; Exchange 51, Group 3A, CPE12; Exchange 51, Group 3B, CPE12 . . . Exchange 51, Group 3Y, CPE12.

The example demonstrates how the network is sampled based on the hierarchy information. Real-world scenarios include hundreds (200 to 900) of customer's CPE's connected to a DSLAM, 10 to 100 DSLAM's per exchange, 10 to 100 exchanges per city etc. resulting in several thousand (2000 to 9000) DSLAMs in a deployed network. With a hierarchy of CPE's, the probe 32 of the present invention supplies the monitoring data to determine the latest network health of any level in the tree. By selecting one CPE from each group, exchange, city or region, the probe 32 can quickly get an overview of the overall network's health from the first subset of CPE's. Alternatively, each subset of CPE's can be based on a larger area, e.g. exchange, city or county, instead of each node, whereby one, or a small group (1 to 5) of CPE's, is monitored from each plurality of exchanges for each time segment. For a smaller number of CPE's the time segment can also be reduced, whereby a very rapid response for the overall network segments can be obtained. For example: every 5 to 15 minutes CPE1 from Group 1A of exchange 41, CPE1 of Group 2A of exchange 42, and CPE 1 of Group 3A of exchange 43 are monitored providing a continuous indication of the health of each exchange.

A plurality of different sample procedures can be performed based on different hierarchical structures in the same network, e.g. a set of deep dives is performed based on a reported problem with TNT VOd services (Service commonality), a set of deep dives are performed based on devices transmission speeds (equipment commonality), and one based on address (geopraphical commonality).

Figure 4:
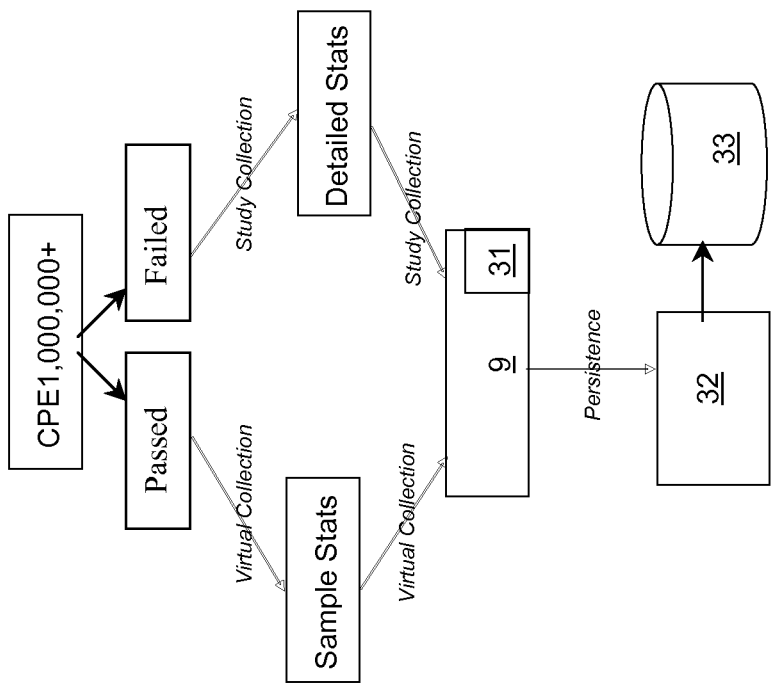
FIG. 4 is a schematic representation of a portion of the network of FIG. 2.

Alternatively or further to minimize overall system throughput, the frequency of collection may be set by the probe 32 depending on the quality state of the individual CPE devices. With reference to FIG. 4, after an initial set of performance management statistics, such as those hereinbefore discussed, have been retrieved, the CPE's that have been determined by the probe 32 to have good quality are placed or categorized for future monitoring in a first mode, e.g. "Virtual Collection Mode", which means statistics will be collected by the EMS 31 and the probe 32 at a first frequency or period, typically once or twice per day, as hereinbefore discussed, although this interval is configurable by the suitably programming instructions to the probe 32. For CPE devices 2 in which poor quality, e.g. below a predetermined threshold, has been detected by the probe 32, the collection period or frequency can be increased to a second frequency or period with a higher frequency or a shorter time period therebetween to allow for more detailed analysis by the probe 32. In the second or "Study Collection Mode" the probe 32 analyzes statistics every 10 to 60 minutes, preferably 15 minutes, although this time period is also configurable. The probe 32 may place any CPE device into the Study Collection Mode based on other predetermined factors, e.g. relating to the client, such as importance of the client and the length of time the CPE has been attached to the network. For example, new customers may be placed in the Study Collection Mode for a certain time, e.g. two weeks to two months, to ensure their quality of service is at a constantly high level.

The collection mode, i.e. Virtual or Study, determines the collection interval based on the state of each CPE device. Moreover, the probe 32 can also determine which set of statistics are collected based on the state of the CPE device. For example, in Virtual Collection Mode, there may be only a small number of statistics required for analysis, e.g. 5 to 10 performance management statistics, for monitoring broad statistics, e.g. current upstream and downstream transmission rates (Kbps), DSL status, whereas with the Study Collection Mode there could be potentially be a much larger number of statistics required for analysis, e.g. 20 to 40 performance management statistics, based on the transmission domain (fiber, cable or DSL), to monitor additional statistics relating to the specific problems causing the degradation of the CPE's state or in accordance with designated standards.

To determine the state of each CPE devices, at least one conditional predetermined threshold is set at the statistic level to determine if the statistic passes or fails the predetermined threshold. Preferably, a plurality of predetermined threshold levels are set, e.g. good, fair, unknown, or poor to provide a clearer picture of the status of each statistic. Alternatively or in addition, weights can be assigned for each statistic, e.g. an integer from 1 to 100, which provides a very clear picture of how poor each statistic is, and which can then be used for an overall ranking for each CPE 2 by adding all or a selected number of the weights to provide an overall weighted score. The overall score can then be compared to one or more predetermined thresholds to determine what the overall status of each CPE device is. Preferably, the statistics are grouped into domains which map to network segmentation and services. Five example domains include: Wide Area Network, Local Area Network, Internet Service, Voice Service, and Video Service. Analysis is an important aspect of scaling the network since the CPE devices 2 can be sampled in a limited way at a large scale, but then have more detailed analysis based on the detection of poor quality.

Figure 5:
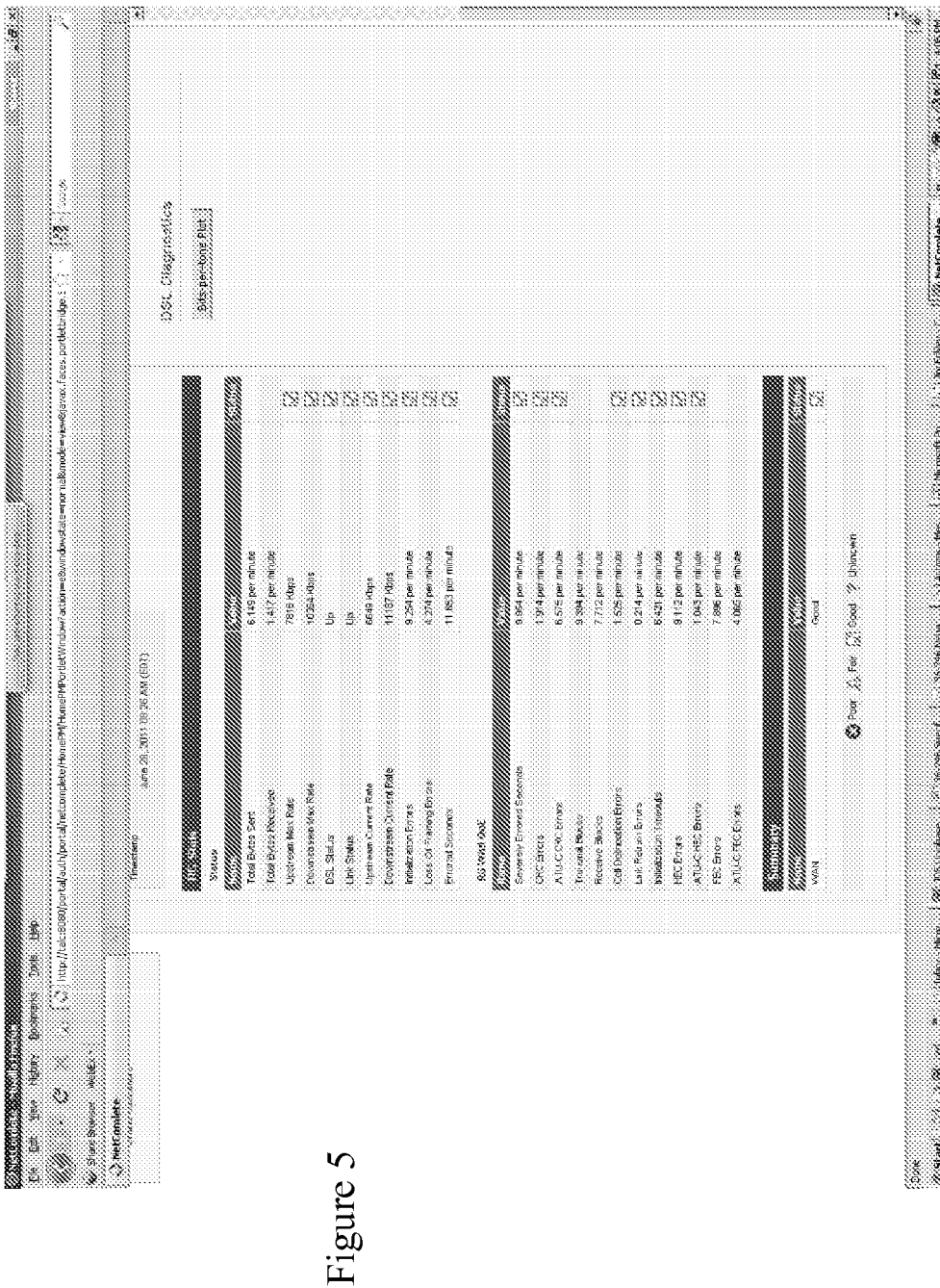
FIG. 5 illustrates a graphic user interface with a list of monitored statistics and their status.

Examples of statistics monitored from the CPE equipment are illustrated in FIG. 5, and include: Total Bytes Sent, Total Bytes Received, Upstream Max Rate, Downstream Max Rate, DSL Status, Link Status, Upstream Current Rate, Downstream Current Rate, Initialization Errors, Loss of Framing Errors, and Errored Seconds. Statistics specific to WAN monitoring include: Severely Errored Seconds, CRC Errors, ATU-C Errors, Transmit Blocks, Receive Blocks, Call Delineation Errors, Link Refrain Errors, Initialization Timeouts, HEC Errors, ATU-C HEC Errors, FEC Errors, and ATU-C FEC Errors. The majority of the statistics, marked with a green checkmark, are above their predetermined "good" threshold, indicating that the CPE in question is performing within desired and acceptable limits. If the statistics measured below the predetermined "poor" threshold then the status column would display a "poor" marker, e.g. a red circle with an X. Moreover, a third state can be provided between the "good" threshold and the "poor" threshold, namely a "fair" state, which would be indicated by a "fair" indicator, e.g. an orange triangle with an exclamation mark.

Collection modes may have different persistence schemes. For example, if a CPE device is in Virtual Collection Mode and all statistics specified in the Statistic Set are good then persistence may not be required, i.e. the network connection to the CPE may be allowed to be disconnected and the statistics not saved to the memory 33. However, after the analysis of statistics indicates that the CPE device has poor quality, i.e. the CPE is in Study Collection Mode, then persistence can begin to capture data and save to the memory 33 at the time the poor quality was detected. Virtual Collection Mode data can be configured to always enforce persistence of statistics, whether good or bad, to ensure connection of the CPE device to the network.

We claim:

1. A method of monitoring a plurality of customer premises equipment (CPE) devices connected to a network, utilizing a monitoring probe stored in a non-transitory machine readable storage device, the method comprising:
   a) grouping the plurality of CPE devices into at a plurality of groups based on a commonality therebetween;
   b) setting a first time period for collection of monitoring data for all of the CPE devices;
   c) setting a plurality of subsets of CPE devices, each subset of CPE devices comprising a different CPE device from each of the groups;
   d) setting a second time period, shorter than the first time period, for collection of monitoring data from one of the subsets of the CPE devices;
   e) collecting monitoring data from each subset of CPE device during each corresponding second time period consecutively until the first time period expires and the monitoring data from all of the CPE devices is collected.

2. The method according to claim 1, wherein the commonality is selected from the group consisting of geographical location, network proximity, and service type.

3. The method according to claim 1, wherein step a) further comprises mapping the plurality of CPE devices into a hierarchy including at least three levels; and wherein step c) includes setting the plurality of subsets based on the hierarchy.

4. The method according to claim 3, wherein the hierarchy of groups includes a first level comprised of all CPE devices connected to a network access node, a second level comprised of all CPE devices connected to a network exchange, and a third level comprised of all CPE devices connected to network exchanges in a city.

5. The method according to claim 1, further comprising configuring the first time period to between 12 and 48 hours.

6. The method according to claim 1, further comprising configuring the second time period to between 15 minutes and 2 hours.

7. The method according to claim 1, further comprising:
   i) determining a state of quality of operation of each of the plurality of CPE devices and grouping the plurality of CPE devices into at least first and second modes based on the quality of operation; and
   ii) setting a frequency for collection of the monitoring data for each CPE device based on the mode in which the CPE device was set, the first mode of devices being monitored more frequently than the second mode.

8. The method according to claim 7, further comprising: setting which set of statistics are to be collected based on the mode in which the CPE device was set, the first mode of CPE devices having more statistics collected than the second mode of CPE devices.

9. The method according to claim 7, wherein the frequency of the first mode is once every 10 to 60 minutes.

10. The method according to claim 7, wherein the frequency of the second mode is once every 12 to 24 hours.

11. The method according to claim 8, wherein a first set of statistics for the first mode comprises 5 to 10 statistics.

12. The method according to claim 8, wherein a second set of statistics for the second mode comprises 20 to 40 statistics.

13. The method according to claim 7, wherein step i) comprises monitoring a plurality of statistics on each CPE device, and determining whether each CPE device performs above a predetermined threshold.

14. The method according to claim 13, wherein each statistic is given a weighted score, and all of the weighted scores are used to provide an overall score for each CPE device.

15. The method according to claim 1, further comprising: storing the monitoring data in a data base.

16. The method according to claim 15, further comprising: setting a persistence level based on the mode in which the CPE device was set, the first mode of CPE devices have a higher persistence requirement that the second mode of CPE devices.

17. A non-transitory machine-readable storage device for storing information enabling a network monitoring agent to perform a process, the process comprising:
   a) grouping the plurality of CPE devices into at a plurality of groups based on a commonality therebetween;
   b) setting a first time period for collection of monitoring data for all of the CPE devices;
   c) setting a plurality of subsets of CPE devices, each subset of CPE devices comprising a different CPE device from each of the groups;
   d) setting a second time period, shorter than the first time period, for collection of monitoring data from one of the subsets of the CPE devices;

e) collecting monitoring data during each second time period until the first time period expires and the monitoring data from all of the CPE devices is collected.

18. The non-transitory machine-readable storage device according to claim 17, wherein the process further comprises:
determining a state of quality of operation of each of the plurality of CPE devices and grouping the plurality of CPE devices into at least first and second modes based on the quality of operation; and
setting a frequency for collection of the monitoring data for each CPE device based on the mode in which the CPE device was set, the first mode of devices being monitored more frequently than the second mode.

19. The non-transitory machine-readable storage device according to claim 18, wherein the process further comprises:
setting which set of statistics are to be collected based on the mode in which the CPE device was set, the first mode of CPE devices having more statistics collected than the second mode of CPE devices.

* * * * *